United States Patent Office 3,244,619
Patented Apr. 5, 1966

3,244,619
SEPARATION PROCESS
William F. Franz, Hopewell Junction, and Howard V. Hess, Glenham, N.Y., assignors to Texaco Inc., New York, N.Y., a corporation of Delaware
No Drawing. Filed Feb. 10, 1964, Ser. No. 343,460
10 Claims. (Cl. 208—310)

This application is a continuation-in-part of our co-pending application Serial No. 793,982, filed February 18, 1959, now abandoned.

This invention relates to a method of separating a mixture of organic compounds. More particularly, this invention relates to a process, involving adsorption and desorption, for the separation of straight chain hydrocarbons from a mixture containing the same together with non-straight chain hydrocarbons.

Previously disclosed methods for treating a mixture of straight chain hydrocarbons and non-straight chain hydrocarbons, involving selective adsorption of the straight chain hydrocarbons, have involved isobaric adsorption-desorption operations. When operations involving adsorption and desorption of straight chain hydrocarbons are carried out at substantially the same pressure it has been a practice to carry out the desorption operation at a relatively elevated temperature, higher than the adsorption temperature, so that the adsorbed straight chain hydrocarbons may be more quickly desorbed from the selective adsorbent. Accordingly, a desorption temperature substantially greater, for example, 10–400 degrees Fahrenheit, than the adsorption temperature has been employed. Following the high temperature desorption operation the resulting desorbed-regenerated adsorbent must be cooled to the desired adsorption temperature. This cooling of the hot desorbed-regenerated adsorbent is time consuming. Moreover, it is obvious that the time required to effect cooling of the hot desorbed-regenerated adsorbent to the desired adsorption temperature restricts the throughput or capacity of the adsorptive separation process.

Further, in previously disclosed adsorptive separation processes various manipulative steps have been employed to separate the residual treated petroleum fraction remaining in contact with the adsorbent after the adsorbent has been saturated and prior to effecting desorption of the adsorbed material, such as straight chain hydrocarbons, therefrom. More particularly, in previously disclosed adsorptive separation processes, following the adsorption step it has been proposed to displace any treated material from contact with the adsorbent by means of a gaseous displacing agent so that upon desorption, the resulting desorbate is substantially free of any of the material undergoing treatment.

It is an object of this invention to provide an improved process involving the selective adsorption of straight chain hydrocarbons from a mixture containing the same together with non-straight chain hydrocarbons, followed by desorption of the adsorbed straight chain hydrocarbons.

Another object of this invention is to increase the rate or throughput of an adsorptive separation process involving adsorption and desorption operations.

Yet another object of this invention is to provide a process for the selective adsorption of straight chain hydrocarbons from a mixture containing the same, involving substantially isothermal adsorption and desorption operations.

Still another object of this invention is to provide a rapid, relatively simple adsorption operation for the treatment of petroleum fractions containing straight chain hydrocarbons in admixture with non-straight chain hydrocarbons wherein there is separately recovered streams comprising treated petroleum fraction now substantially free of straight chain hydrocarbons and a desorbate stream substantially free of non-straight chain hydrocarbons.

How these and other objects of this invention are accomplished will become apparent in the light of the accompanying disclosure. In at least one embodiment of the practice of this invention at least one of the foregoing objects will be achieved.

In accordance with the invention an improved adsorption-desorption operation is effected, involving the separation of straight chain organic compounds, such as straight chain hydrocarbons, from a mixture containing the same together with non-straight chain organic compounds, such as non-straight chain hydrocarbons, by contacting said mixture with an adsorbent which selectively adsorbs straight chain organic compounds, such as straight chain hydrocarbons, to the substantial exclusion of non-straight chain organic compounds, such as non-straight chain hydrocarbons. Further, in the practice of this invention following the adsorption operation, i.e., when the adsorbent is saturated, which is carried out at a relatively elevated pressure $P_1$, the selective adsorbent is relatively quickly or rapidly depressured to a pressure $P_2$, substantially lower than the adsorption pressure but not less than atmospheric pressure. During this rapid depressuring operation there is removed from contact with the adsorbent the feed mixture, such as a petroleum fraction originally containing straight chain and non-straight chain hydrocarbons, now substantially free of straight chain hydrocarbons, from contact with the adsorbent. Following the depressuring step the adsorbent, still substantially saturated with straight chain hydrocarbons, is desorbed of the adsorbed straight chain hydrocarbons by contacting the adsorbent with a suitable hot desorbing fluid. The desorption operation is desirably carried out at a temperature substantially the same as the adsorption temperature or somewhat greater or less than the adsorption temperature. Further, the desorption operation is carried out at a pressure substantially less than the adsorption pressure, such as a pressure $P_2$ at a value wherein $P_2$ is in the range of $0.01 P_1 - 0.5 P_1$.

By rapidly depressuring the adsorbent following the adsorption operation and while still in contact with the resulting treated mixture undergoing fractionation by selective adsorption it has been observed that there is recovered from contact with the adsorbent treated material substantially free of the adsorbed material, the straight chain hydrocarbons.

More particularly described, in the practice of this invention a mass of particle-form solid adsorbent which selectively absorbs straight chain hydrocarbons to the substantial exclusion of non-straight chain hydrocarbons is confined, such as in the form of a fixed bed, in a suitable adsorption zone a gaseous mixture containing straight chain hydrocarbons and non-straight chain hydrocarbons. This gaseous mixture is introduced into the adsorption zone at a suitable rate such that the pressure within the adsorption zone which is originally at a value $P_2$ reaches a value $P_1$ during the adsorption operation, $P_2$ being substantially lower than $P_1$ but not below atmospheric pressure.

While the gaseous mixture is being introduced into the adsorption zone the adsorbent therein selectively adsorbs therefrom the straight chain hydrocarbons to the substantial exclusion of the non-straight chain hydrocarbons. The introduction of gaseous mixture into the adsorption zone and the adsorption of straight chain hydrocarbons by the adsorbent therein continues at a suitable elevated pressure such as $P_1$ until the adsorbent is substantially saturated with straight chain hydrocarbons.

During the adsorption operation there may be withdrawn from the adsorption zone the resulting treated effluent now substantially free of straight chain hydrocarbons in an amount and at a rate, if desired, as may be required to maintain the adsorption pressure at a given value.

When the adsorbent is substantially saturated with straight chain hydrocarbons, the introduction of gaseous mixture thereinto is discontinued. Thereafter the adsorbent or the adsorption zone is rapidly depressured to a suitable low value $P_2$, such as a pressure equal to that in the adsorption zone just prior to the introduction of the gaseous mixture thereinto, substantially lower than the adsorption pressure $P_1$. This depressuring operation is carried out relatively rapidly, in a matter, particularly as compared to the adsorption operation, of minutes such as a time period in the range of from about 0.5 to 15 minutes, preferably 0.5 to 10 minutes, depending upon the size of the adsorption zone, the adsorption pressure $P_1$ and the desired desorption pressure $P_2$. As a result of the depressuring operation there is recovered from the adsorption zone resulting treated effluent substantially free of straight chain hydrocarbons and containing substantially only non-straight chain hydrocarbons. Since the depressuring operation is carried out relatively rapidly desorption of the adsorbed straight chain hydrocarbons from the adsorbent does not occur to any substantial extent.

Following the depressuring operation and when the pressure within the adsorption zone has reached a suitable low value $P_2$ there is introduced into contact with the adsorbent therein a suitable desorbing agent effective to desorb the adsorbed straight chain hydrocarbons from the adsorbent. During this desorption operation the resulting desorption effluent containing desorbed straight chain hydrocarbons and desorbing agent is separately recovered. The desorbing fluid is preferably a material such as a non-straight chain hydrocarbon, which is not adsorbed by the adsorbent, and desirably is a material which is readily separable by fractionation, condensation or the like from the resulting desorbed straight chain hydrocarbons. In the practice of this invention the time period required for adsorption and time period required for depressuring-desorption are adjusted to be substantially the same. Following the desorption operation the adsorption operation is again commenced by the introduction of the gaseous mixture to be separated into the adsorption zone.

Any selective adsorbent which selectively adsorbs straight chain organic compounds, such as straight chain hydrocarbons, to the substantial exclusion of non-straight chain organic compounds, such as non-straight chain hydrocarbons, is suitable in the practice of this invention. By straight chain organic compounds is meant any acyclic, straight chain organic compound which does not evidence side chain branching. Examples of straight chain organic compounds are the normal paraffins, e.g., n-butane, n-pentane, n-hexane, the n-butylenes, the n-pentenes, the n-hexenes, butadiene, the straight chain acetylenic compounds and their higher and lower molecular weight homologs. By non-straight chain organic compounds is meant aromatic, alicyclic or naphthenic, or acylic or aliphatic compound which possesses side chain branching. Examples of non-straight chain organic compounds are benzene, toluene, isopentane, isohexane, isobutane, cyclohexane, methylcyclohexane, cyclopentadiene and their respective higher and lower molecular weight homologs.

In the practice of this invention it is preferred to employ as the selective adsorbent material certain natural or synthetic zeolites or alumino-silicates, such as a calcium alumino-silicate, which exhibit the properties of a molecular sieve, that is, matter made up of porous crystals wherein the pores of the crystals are of molecular dimension and are of uniform size. A particularly suitable solid adsorbent for straight chain organic compounds is a calcium alumino-silicate, a sodium calcium alumino-silicate, designated as Linde Type 5A Molecular Sieve. The crystals of this particular calcium alumino-silicate have a pore size of diameter of about 5 Angstrom units, a pore size sufficiently large to admit straight chain hydrocarbons, such as the normal paraffins, to the substantial exclusion of the non-straight chain naphthenic and aromatic and isoparaffinic and isoolefinic hydrocarbons.

Other suitable solid selective adsorbents include the synthetic and natural zeolites which, when dehydrated, may be described as crystalline zeolites having a rigid three dimensional anionic network and having interstitial dimensions sufficiently large to adsorb straight chain hydrocarbons but sufficiently small to exclude non-straight chain hydrocarbons. The naturally occurring zeolite, chabazite, exhibits such desirable properties. Another suitable naturally occurring zeolite is analcite which, when dehydrated, and when all or a part of the sodium is replaced by an alkaline earth metal such as calcium yields a material which may be represented by the formula $(CaNa_2)Al_2Si_4O_{12} \cdot 2H_2O$ and which, after suitable conditioning, will adsorb straight chain hydrocarbons to the substantial exclusion of non-straight chain hydrocarbons. Naturally occurring or synthetically prepared phacolite, gmelinite, harmotome and the like or suitable base exchange modifications of these materials are also useful.

During the adsorption operation any suitable elevated adsorption pressure $P_1$ may be employed. Generally an adsorption pressure in the range of about 50 to 2000 p.s.i.g. is suitable. Similarly during the desorption operation any suitable desorption pressure not less than atmospheric pressure which is relatively reduced with respect to the adsorption pressure may be employed, such as a desorption pressure in the range of about 0 to 500 p.s.i.g. As indicated hereinabove, in the practice of the invention the desorption pressure $P_2$ is less than the adsorption pressure $P_1$ but not below atmospheric pressure. Usually the desorption pressure $P_2$ is at least about 50 lbs. per sq. in. less than the adsorption pressure.

In the practice of this invention it is preferred to maintain the adsorption temperature and the desorption temperature substantially the same. The adsorption temperature is carried out at a temperature, correlated with respect to the adsorption pressure and the mixture undergoing fractionation so as to maintain the mixture in the gaseous phase during the adsorption operation. Similarly the desorption temperature is correlated with the desorption pressure and the material being desorbed so that the desorbed material is recovered in the gaseous phase. An adsorption temperature in the range of from about 200–800° F., has been found to be satisfactory. Similarly a desorption temperature in the range of from about 200–800° F. has been found to be satisfactory.

The depressuring operation, wherein the pressure within the adsorption zone is rapidly reduced from an elevated value $P_1$ to a relatively low value $P_2$, is accomplished relatively rapidly, in a matter of minutes, from about 0.5 to 15 minutes, with a period of from about 0.5 to 10 minutes being preferred. During the depressuring operation which is effected when the adsorbent is substantially saturated with the adsorbable component (straight chain hydrocarbons) the resulting treated gaseous mixture, now substantially free of the adsorbable component but in contact with and surrounding the adsorbent, is suddenly, upon pressure reduction, removed from contact with the adsorbent. The amount of treated material thus removed is substantially free of the adsorbable component. By carrying out the depressuring operation just prior to the desorption operation wherein the adsorbable component is desorbed from the adsorbent by contact with a suitable desorbing agent it is possible to recover from the adsorption zone as desorbate the adsorbable component substantially free of the non-adsorbable component present in the feed mixture originally introduced into the adsorption zone.

Following the depressuring operation there is introduced into the adsorption zone into contact with the adsorbent therein a suitable gaseous desorbing agent or fluid at an elevated temperature and under conditions to desorb the adsorbed material from the adsorbent. The time required to substantially completely desorb the adsorbed material from the adsorbent together with the time required to effect the depressuring operation is adjusted so that the total time thereof is substantially the same as the time required to satisfactorily complete the adsorption operation, i.e., to saturate the adsorbent within the adsorption zone. By thus coordinating the adsorption time and the total depressuring-desorption times it is possible to carry out the practice of this invention on a substantially continuous basis while employing only two adsorption zones with the result that while one adsorption zone is undergoing adsorption the other adsorption zone can be undergoing the depressuring-desorption operation.

In the practice of this invention any suitable material may be employed as the desorbing fluid. More particularly, any suitable gaseous desorbing medium, preferably a material which is not adsorbed by the adsorbent, may be employed. Suitable desorbing materials include isobutane, isopentane, isohexane, isoheptane, hydrogen, methane, flue gas, nitrogen, carbon dioxide and the like. Although it is preferred in the practice of this invention to employ as a desorbing fluid a material which is not adsorbed by the adsorbent such materials as ethane, propane, n-butane, n-pentane and the like might suitably be employed. Desirably the physical properties such as boiling point, solubility and the like of the desorbing fluid is such as compared with the desorbed material so that it is readily possible to separate the desorbing fluid from the resulting desorbate.

As indicated hereinabove, the practice of this invention is particularly applicable to the separation of straight chain hydrocarbons from mixtures containing the same together with non-straight chain hydrocarbons. Straight chain hydrocarbon-containing mixtures which are suitably treated in accordance with this invention for the separation of the straight chain hydrocarbons therefrom include the various petroleum fractions such as a naphtha fraction, a kerosene fraction, a diesel oil fraction, a gas oil fraction and the like. Particularly suitable for treatment are those straight chain hydrocarbon-containing fractions having a boiling point or boiling range in the range 40–600° F. and containing at least a substantial amount of straight chain hydrocarbons therein, e.g., 2–35% by volume and higher.

The following examples are illustrative of the practice of this invention.

*Example 1*

In a selective adsorption operation for the separation of n-hexane from a n-hexane-containing fraction (mixed hexanes fraction) there was introduced into an adsorption zone containing an alumino-silicate molecular sieve adsorbent which selectively adsorbs straight chain hydrocarbons to the substantial exclusion of non-straight chain hydrocarbons a hot (about 500° F.) gaseous n-hexane-containing mixture at a rate of about 277 barrels per hour. Just prior to the introduction of the gaseous mixture the adsorption zone was at a pressure of about 20 p.s.i.g. During the adsorption operation upon continued introduction of the gaseous mixture into the adsorption zone the pressure was brought up to a value of about 115 p.s.i.g. and the temperature in the adsorption zone to a value of about 500° F. Also, during the adsorption operation and while the straight chain hydrocarbon, n-hexane, was being selectively adsorbed from the said mixture there was controlledly removed from the adsorption zone the resulting treated hexane fraction, now free of n-hexanes, at the rate of about 216 barrels per hour so as to maintain the pressure within the adsorption zone at a value of 115 p.s.i.g. The total time required to substantially saturate the adsorbent within the adsorption zone with n-hexane was about 20 minutes.

Following the adsorption operation the introduction of gaseous n-hexane-containing feed thereinto was discontinued and the adsorption zone rapidly depressured to a pressure of about 35 p.s.i.g., a pressure substantially the same as at start of adsorption operation. This depressuring operation took in about 2 minutes. During the depressuring operation there was separately recovered the resulting treated hexane fraction which was found to be substantially completely free of n-hexane.

Following the depressuring operation there was introduced into the adsorption zone into contact with the adsorbent therein hot gaseous isopentane to desorb the adsorbed n-hexane from the adsorbent therein. By heating the isopentane desorbing fluid to a suitable temperature such as about 580° F. it is possible to carry out the desorption operation at a temperature subsantially the same as the adsorption temperature, the hot desorbing fluid, isopentane, serving to supply substantially all of the heat of desorption necessary to effect desorption of the adsorbed n-hexane from the adsorbent. After a period of about 18 minutes the resulting desorption effluent issuing from the adsorption zone was substantially free of n-hexane.

Following the desorption operation there was again introduced into the adsorption zone additional n-hexane-containing feed for the separation of n-hexane therefrom, the aforesaid operations of adsorption, depressuring-desorption being carried out on a substantially continuous basis.

*Example 2*

In another example illustrative of the practice of this invention a feed mixture of mixed hexanes, containing about 24% by wt. n-hexane, was introduced into a adsorption zone and employed to pressurize the adsorption zone to a pressure of about 240 p.s.i.g. As the mixed hexanes were introduced into the adsorption zone the alumino-silicate molecular selective adsorbent therein selectively adsorbed the n-hexane therefrom, the adsorption operation being carried out at a temperature of about 600° F. The time required to substantially completely saturate the adsorbent within the adsorption zone with n-hexane was about 8 minutes.

Following the aforesaid adsorption operation the adsorption zone was rapidly depressurized. The product recovered from the adsorption zone as a result of the depressuring operation amounted to about 65% by wt. of the charge thereto and contained about 0.4% by wt. n-hexane, the rest being non-straight chain $C_6$ hydrocarbons. By operating in this manner substantially complete removal, 98.7% of the n-hexane from the mixed hexane fraction was effected by the adsorbent, with substantially no desorption or stripping of the adsorbed n-hexane from the adsorbent occurring during the rapid depressuring operation. The aforesaid rapid depressuring operation, from a pressure of about 240 p.s.i.g. to a pressure in the range 0–25 p.s.i.g., took place in about 2 minutes.

As will be apparent to those skilled in the art upon reading the foregoing disclosure many modifications, substitutions and changes are possible in the practice of this invention without departing from the spirit or scope thereof.

We claim:

1. A method of treating a gaseous petroleum fraction containing straight chain hydrocarbons and non-straight chain hydrocarbons which comprises introducing said gaseous petroleum fraction into an adsorption zone containing therein an alumino-silicate molecular sieve adsorbent which selectively adsorbs straight chain hydrocarbons to the substantial exclusion of non-straight chain hydrocarbons to adsorb straight chain hydrocarbons from said petroleum fraction, continuing the introduction of said gaseous petroleum fraction into said adsorption zone to saturate said adsorbent with straight chain hydrocarbons, said adsorption of straight chain hydrocarbons from said petroleum fraction by means of said adsorbent being carried out at an elevated temperature and at a super atmospheric pressure, discontinuing the introduction of said gaseous petroleum fraction into said adsorption zone, removing from said adsorption zone a resulting treated petroleum fraction containing substantially only non-straight chain hydrocarbons by the step which consists in rapidly depressuring said adsorption zone to a reduced pressure not below atmospheric pressure, and then desorbing the adsorbed straight chain hydrocarbons from said adsorbent within said adsorption zone at said reduced pressure, the desorption of said straight chain hydrocarbons from said adsorbent being carried out under conditions such that substantially all of the straight chain hydrocarbons adsorbed by said adsorbent are desorbed therefrom, the temperature of said adsorbent during the depressuring and desorption operations being substantially unchanged.

2. A method as claimed in claim 1 wherein said rapid depressuring is carried out in a time period between about 0.5 and 10 minutes.

3. A method as claimed in claim 1 wherein the adsorption pressure is from about 50 to about 250 p.s.i.g. and said reduced pressure is from about 0 to 25 p.s.i.g.

4. A method of treating a gaseous petroleum fraction containing straight chain hydrocarbons and non-straight chain hydrocarbons which comprises contacting said petroleum fraction within an adsorption zone with an alumino-silicate molecular sieve selective adsorbent which selectively adsorbs straight chain hydrocarbons to the substantial exclusion of non-straight chain hydrocarbons to adsorb straight chain hydrocarbons from said petroleum fraction, the aforesaid adsorption operation being carried out at a super atmospheric pressure and an elevated temperature and for a period of time sufficient to substantially saturate said adsorbent with straight chain hydrocarbons and to yield a resulting treated petroleum fraction substantially free of straight chain hydrocarbons, discontinuing said contacting, removing from said adsorption zone the resulting treated petroleum fraction substantially free of straight chain hydrocarbons by the step which consists in rapidly depressuring said adsorption zone to a reduced pressure not below atmospheric pressure, and then desorbing the adsorbed straight chain hydrocarbons from said adsorbent within said adsorption zone at said reduced pressure by contacting said adsorbent therein with a suitable gaseous desorbing medium, the temperature of the adsorbent during said adsorption operation and during said depressuring and desorption operations, remaining substantially unchanged, and the times required for said adsorption operation and the depressuring and desorption operations, together, being substantially the same.

5. A method as claimed in claim 4 wherein said rapid depressuring is carried out in a time period between 0.5 and 10 minutes.

6. A method in accordance with claim 4 wherein said adsorption and depressuring-desorption operations are carried out at a temperature in the range 300–800° F.

7. A method in accordance with claim 4 wherein said gaseous desorbing medium is a normally gaseous hydrocarbon.

8. A method in accordance with claim 4 wherein said adsorption and said depressuring and desorption operations are carried out at a temperature in the range 300–800° F. and at a pressure in the range 0.5–750 p.s.i.g.

9. A method of treating a gaseous petroleum fraction containing straight chain hydrocarbons and non-straight chain hydrocarbons which comprises introducing said fraction into an adsorption zone, said adsorption zone being provided with a fixed bed of particle-form alumino-silicate molecular sieve adsorbent which selectively adsorbs straight chain hydrocarbons to the substantial exclusion of non-straight chain hydrocarbons, to adsorb straight chain hydrocarbons from said fraction, continuing the introduction of said petroleum fraction into said adsorption zone to build up the pressure therein to a substantial elevated value, withdrawing from said adsorption zone resulting treated petroleum fraction now substantially free of straight chain hydrocarbons while continuing the introduction of additional petroleum fraction thereinto until said adsorbent within said adsorption zone is substantially saturated with straight chain hydrocarbons, discontinuing the introduction of said additional petroleum fraction into said adsorption zone, discharging from said adsorption zone a resulting treated additional petroleum fraction substantially free of straight chain hydrocarbons by the step which consists in rapidly depressuring said adsorption zone to a reduced pressure not below atmospheric pressure, the aforesaid depressuring operation being carried out during a time period in the range 0.5 to 15 minutes, then contacting said adsorbent within said adsorption zone with a gaseous desorbing medium under the aforesaid reduced pressure under conditions to desorb the adsorbed straight chain hydrocarbons from said adsorbent and separately recovering the resulting desorbed straight chain hydrocarbons, the aforesaid adsorption and depressuring-desorption operations being carried out substantially isothermally.

10. A method as claimed in claim 9 wherein the pressure $P_1$ during adsorption is in the range 50 to 2000 p.s.i.g. and wherein said reduced pressure $P_2$ is in the range 0.01 to 0.5 $P_1$.

References Cited by the Examiner
UNITED STATES PATENTS

| | | | |
|---|---|---|---|
| 2,859,256 | 11/1958 | Hess et al. | 260—676 |
| 2,963,519 | 12/1960 | Kasperik et al. | 260—676 |
| 2,966,451 | 12/1961 | Caesar et al. | 208—28 |

ALPHONSO D. SULLIVAN, *Primary Examiner.*